Patented June 12, 1951

2,556,282

UNITED STATES PATENT OFFICE 2,556,282

CARRAGHEENATE ARABATE COAZERVATE AND METHOD OF MANUFACTURE

Victor Charles Emile Le Gloahec, Rockland, Maine, assignor to Algin Corporation of America, New York, N. Y., a corporation of Delaware No Drawing. Application November 17, 1949, Serial No. 127,998

15 Claims. (Cl. 260—209)

1

This invention relates to complex colloidal materials and the manufacture thereof and is directed to the novel complex colloidal material which is the product of coazervation interaction between a carragheenate and arabate. One of the uses of the novel complex colloidal material is that of a stabilizer for milk products, the new product being particularly suitable as a stabilizer for ice cream.

At many locations along the seashores of the American continent and the coasts of Europe and Asia, quantities of seaweeds of the floridea type are encountered which contain mucilaginous or gel-forming material of a polyuronide nature. The mucilaginous material is the kind found in marine plants of the gigartinacea family. Among them one may mention as typical chondrus crispus, fucus crispus, carragheen (Irish moss), gargartina pistilla, gigartina mamillosa, gracilaria lichenoide, gelidium corneum, and gelidium cargilageneum.

For many years past the mucilaginous material contained in seaweeds of the type above mentioned has been recovered therefrom and has been used for a wide variety of purposes, particularly as a thickener or as a clarifying agent. The mucilaginous material recovered from such seaweeds is commonly referred to as "gelose," but in chemical terminology is generally referred to as "carragheen" and is identical with or closely similar to the carragheen recovered from Irish moss, which is the most extensive source of mucilaginous material of the kind in question. For the purpose of brevity and in accordance with the general practice, the mucilaginous material of the kind in question will be referred to hereinafter as "carragheen." Recent studies of carragheen mucilage indicate the presence of disulfate esters of a type similar to fucoidine which will be represented by the following formula:

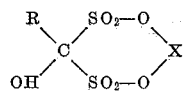

in which R represents a chain of varying lengths of d-galactose residues, and X represents a metal cation. In the natural occurring carragheen mucilage the metal cation is mostly calcium although other metal cations may be present such as magnesium.

Extracted carragheen has been widely used in a number of dairy industry products such as certain cheeses, chocolate milk drinks and ice cream. Carragheen has certain special properties which enables it to perform various functions in products. Thus in chocolate milk drinks carragheen acts as a suspending agent for the cocoa while in the manufacture of certain cheeses it acts to perform the function of a jellifying or coagulating agent. The carragheen also has been used in ice cream products. However, the use of carragheen in such products has been attended with certain difficulties, as will be mentioned more in detail below.

Carragheen undoubtedly is not chemically or physically inert towards milk products. Its ability to react on proteinous compounds like casein, at least by the phenomenon of absorption, is well demonstrated in milk and the old receipt for blanc mange with carragheen extract is a good illustration of the behavior of carragheen towards milk.

The behavior of carragheen when incorporated in a milk product and the type of action which results from such incorporation depends upon a number of factors. These factors include the concentration of the carragheen in the milk product mixture and the temperature; the higher the temperature the greater the jellifying effect or even coagulation with syneresis may take place. Especially in the range above 150° F. the action of carragheen towards milk products is very sensitive to temperature change, a variation of only a few degrees resulting in very great changes in the results obtained. Other factors include the nature and the ratio of the cations fixed on the sulphate of the carragheen particle, the degree of polymerization of the carragheen particle, the effect on the carragheen of the method for extracting and for producing the finished carragheen extract and the quality and quantity of any foreign ions which may be present, the chlorides being particularly active. Other factors have to do with the content of the milk product as regards solids and fats as well as other substances which may be present, carragheen being excessively sensitive to such content variations.

Due to the fact that there are so many factors which affect the action of the carragheen when incorporated in milk products serious difficulties have been encountered in properly controlling the action between the carragheen and milk products with which the carragheen is incorporated and it has been very difficult to obtain uniformity of results when using carragheen in such milk product mixtures.

In order to alleviate the difficulties above mentioned when carragheen is used as a stabilizer, the ice cream industry has resorted to various expedients in order to afford better control of the behavior and reactivity of the carragheen. Usually such expedients have involved the addition of one or several substances other than the carragheen for the purpose of modifying the reactivity of the carragheen with the ice cream mix and in order to reduce as much as possible the drawbacks which are encountered when carragheen by itself is used in ice cream mixes. All ice cream stabilizers thus far manufactured using carragheen reflect this approach to the problem and consist of blends of carragheen extract with other substances. The type of added blending substance which is most generally used is an emulsifier such as glyceryl derivative of a fatty acid, the emulsifier being used for the purpose of preventing as far as possible the break down of the emulsion because of separation of the coagulum formed between carragheen and casein. One of the principal difficulties resulting from the use of carragheen in ice cream mixes results from the production of the coagulum which carragheen forms with casein and from the accompanying formation of syneresis liquid which, during subsequent freezing, tends to form ice crystals in an excessive amount. Moreover, carragheen has the property even when used in a very small amount of effecting very great increases in viscosity with the result that if more than a minute amount of carragheen is used the ice cream mix does not flow readily during the operations involved in the commercial production of ice cream. The result is that the stabilizing action which is desired cannot be fully or satisfactorily obtained without running into difficulties due to excessive breakdown of the emulsion and the production of viscosities in excess of that which are consistent with satisfactory production methods.

When a very small quantity of carragheen is used with an emulsifier complete separation of the coagulum with production of excessive syneresis liquid can be prevented but even in such case the stabilization is insufficient and the increase in size of the carragheen casein particles will result in a slowing down of the Brownien movement of the colloid particles in the emulsion so that the only result accomplished by the use of the emulsifier is the dispersion and suspension of the particles. Subsequent passage of the mix through a homogenizer may reduce the particle size but the result in even such cases will be the production of a dispersed gel having rigidity such that it slows down excessively the flow of the ice cream mix over the cooler, thus adversely influencing the rapidity of the temperature exchange, and such that the handling of the cold mixes after pasteurization is rendered more difficult. Moreover, the tendency toward gel formation generally results in an ice cream of a coarse texture and inadequately stabilized either because of lack of sufficient stabilization or because of non-stabilization of the gel towards syneresis, which in turn induces the formation of ice crystals.

Another approach to the problem has been to blend the carragheen and an emulsifier with gums, the gums being either of the vegetable or natural type or of the synthetic type in the nature of cellulose derivatives such as carboxymethylcellulose. Such blends will give partial results in that the gums increase the dispersion of the gel particles and also tend to increase the viscosity of the syneresis liquid, thus retarding the ice crystal formation during the freezing or the resting time in cold storage; but such blends have not yet solved the problem of preparing a stabilizer for ice cream mixes which can be used so as to afford desired stabilization with uniformly satisfactory results.

Another disadvantage which is incident to the use of carragheen in an admixture or blend with other substances results from the fact that it is difficult or impossible to produce such blends so that uniformity of composition can be assured. Because any blend contains different solids having different specific gravities, the result is that the different solids tend to become separated as the result of specific gravity choice during the handling and transportation of the container in which the blend is packaged.

It is an objective of this invention to overcome difficulties such as those which have heretofore been encountered in using carragheen as a stabilizer. It is the further objective of this invention to provide a stabilizer in the form of a complex colloid which is highly effective in its stabilizing action while at the same time having, as compared with carragheen, greatly decreased tendency toward the gelation of milk products with separation of syneresis liquid and having greatly decreased tendency to promote such high viscosities as to excessively interfere with the handling of the stabilized mix. It is a further objective of this invention to provide a stabilizer which, as compared with carragheen, is much less sensitive to temperature variations and which is much less affected by variations in the composition of the mix to which it is added, e. g. which, when used in an ice cream mix, is much less sensitive to variations in the content of milk solids, fat and acidity. It is further an objective of this invention to provide a stabilizer in the form of a complex organic colloid which is homogeneous in its constituency throughout and which can be successfully used by itself without the addition of other substances such as emulsifying agents, gums or the like. It is a further objective of this invention to provide a stabilizer for milk products or the like which is capable of producing uniform and reproducible results in its effect on mixes to which it is added and which can be safely used in more than a minute amount, namely, in any amount desired for obtaining effective stabilization.

The above mentioned objectives have been obtained according to this invention by the production of a new complex organic colloid, namely, an autocomplex coazervate, or more simply a coazervate, the new product being a coazervate derived from carragheen and gum arabic.

The terms "coazervation" and "coazervate" have become well recognized in the field of colloid chemistry in connection with extensive studies bearing on the phenomenon of complex formation by a separation of lyophilic colloids into two liquid phases, the phenomenon being referred to as coazervation and the term coazervate being applied to the heavier colloid-rich layer. Coazervation may be induced under various conditions and even when both of the compounds present bear the same electric charge.

It has been found according to this invention that if naturally occurring carragheen is treated so as to substitute sodium ions for the metal cations present in the naturally occurring carragheen and if gum arabic is likewise treated to remove the cations naturally occurring in gum arabic with the substitution of sodium cations therefor, the modified carragheen and the modified gum arabic will enter into a coazervation interaction to form a coazervate. The coazervation interaction can be promoted by the use of desolvating agents such as alcohol and can be produced in the form of a coagulum that is susceptible to separation and recovery in a marketable condition.

Gum arabic by itself does not have the function of a stabilizer and merely acts to increase the viscosity of aqueous mixes in which it is dissolved when used in a relatively large amount. However, when the gum arabic is modified as above mentioned it has the capacity of forming with the modified carragheen a coazervate product of interaction which has greatly different properties as compared with either carragheen by itself or gum arabic by itself or as compared with a mere mixture of carragheen and gum arabic. Thus the new coazervate product possesses extremely high stabilizing properties while having much less viscosity producing and gel forming characteristics as compared with carragheen alone. For this reason the new coazervate product can be used with very great advantage in ice cream mixes so as to afford a high degree of stabilization without any tendency to break down the emulsion or to increase the viscosity so that the ice cream mix cannot be satisfactorily handled.

The production of the coazervate by the coazervation interaction between modified carragheen and modified gum arabic is peculiar to these substances for gums other than gum arabic do not react similarly and cannot be successfully used to obtain the objectives and advantages which have been obtained according to this invention. So far as I am aware the properties and advantages of the new coazervate product of this invention are special and peculiar thereto and have not been realized in any other material and have not been indicated as being obtainable in any type of product.

In order to afford a better understanding of this invention the preparation of the new coazervate product will be described in connection with the specific example which is described below and which is typical of the preferred practice of this invention.

In order to afford one of the reacting materials an aqueous syrup of sodium carragheenate is first prepared. In other words instead of preparing a syrup containing carragheen in the form that carragheen is naturally found in seaweed, the carragheen is modified so as to substitute sodium cations for the metal cations contained in the naturally occurring carragheen. A method whereby a solution of sodium carragheenate can be prepared is set forth in my application Serial No. 790,726, filed December 9, 1947 for "Recovery of Seaweed Mucilage." According to the preferred practice as set forth in said application, a suitable carragheen-containing seaweed such as Irish moss is subjected to pretreatment with a solution of a sodium salt, preferably sodium sulphate, so as to effect cation exchange in that the sodium is taken up by the carragheen and becomes substituted for the cations in the naturally occurring carragheen in the seaweed which in turn are taken up by the cation exchange material, e. g. with formation of calcium sulphate when sodium sulphate is used for effecting the cation exchange. After the cation exchange step has been carried to the desired extent, namely, until the carragheen in the seaweed does not contain any substantial amount of cations other than sodium, the seaweed, while in an aqueous medium, is subjected to mechanical disintegration so as to reduce aqueous mass to a paste-like flowable condition wherein the cellulose membranes of the seaweed are largely destroyed. In this condition the mass can readily be subjected to filtration particularly when it is mildly heated to a temperature in the order of 40–65° C. thus separating the dissolved sodium carragheenate from the cellulose. The filtrate will consist of the desired aqueous syrup of sodium carragheen.

The syrup of sodium carragheenate ordinarily is obtained at a concentration of around 2% of the sodium carragheenate inasmuch as higher concentrations tend to increase the viscosity to such an extent as to make subsequent handling of the solution difficult. The syrup as obtained in the heated condition above mentioned is preferably cooled to atmospheric temperature and the pH of the syrup is controlled so that it will be of the order of 6.5 to 7 by the addition of a mineral acid such as sulphuric acid or of an alkaline solution such as sodium hydroxide solution, as may be required. A suitable alcohol such as ethyl alcohol is then added to the syrup under agitation in a mixing tank. The quantity of alcohol which is added is such that no coagulation or even gel formation takes place but only a slight increase in viscosity which may result from a certain amount of agglomeration of the colloid particles. For best operating conditions it has been found that the alcohol should be present so as to constitute about 30% by volume of the mixture of alcohol and sodium carragheenate solution. This alcoholic aqueous solution of sodium carragheenate will be referred to hereinafter for the purpose of brevity as solution A.

A solution of gum arabic is separately prepared by incorporating gum arabic in water maintained under agitation in a mixing tank. The concentration of the gum arabic solution may be widely varied and is not a critical factor but it has been found convenient to employ a gum arabic solution of approximately 20% concentration.

The solution of gum arabic is filtered to eliminate the insoluble matters contained in the naturally occurring gum and preferably is brought up to a temperature of about 85–90° C. which temperature is maintained for about an hour. Such heating of the gum arabic solution is by no means essential but some advantage is obtained as a result of this step inasmuch as the heating step serves to inactivate the oxidases and peroxidases which are present in the natural gum. After the heating step the gum arabic solution is cooled down and acidified to a pH of about 1.5. Any mineral acid may be used for the purpose such as sulphuric or hydrochloric. Ordinarily sulphuric acid is preferable. The acidification serves to eliminate metallic cations such as calcium and magnesium contained in the naturally occurring gum and converts the gum arabic to arabic acid. The arabic acid can then be separated from the acidic aqueous medium by the addition thereto of alcohol which has the effect of coagulating the arabic acid. This coagulation of the arabic acid can be effected advantageously when the amount of alcohol added is such to constitute about 65–70% by volume of the mixture of alcohol and gum arabic solution. The coagulum thus produced can be separated from the aqueous alcoholic medium as by draining the aqueous alcoholic medium from the coagulum. The well drained coagulum of arabic acid is next dissolved in water so as to produce a solution having a concentration of about 35% arabic acid. Here again the concentration of the solution is not critical but a relatively high concentration can be more economically handled in the further steps of the process according to this invention. The pH of the solution of the arabic acid is then raised to a value of the order of 7 to 7.5 by the addition of sodium hydroxide.

By the foregoing steps a solution of sodium arabate is prepared which is essentially free of other cations. A suitable alcohol such as ethyl alcohol is then added to the sodium arabate solution until the alcohol content constitutes about 30% by volume of the mixture. This alcoholic solution of sodium arabate is referred to hereinafter as solution B.

The percentage of sodium carragheenate in solution A is determinable and the percentage of sodium arabate in solution B is likewise determinable. Based on the percentage of sodium carragheenate contained in solution A and the percentage of sodium arabate contained in solution B, quantities of the respective solutions are mixed together under slight agitation so that in the resulting mixture there will be twelve parts of sodium carragheenate to eight parts of sodium arabate. Upon making the mixture of solutions A and B the interaction between the sodium carragheenate and sodium arabate will occur as the result of coazervation between these colloids. However, it is preferable, according to this invention, to incorporate in the mixture a small amount, such as about 1%, of potassium chloride which acts as a catalyst so as to improve the yield and so as to afford better control as to the relative proportions of carragheenate and arabate in the coazervate that is formed. The alcohol in the aqueous medium also serves to promote the coazervation between the colloids as a result of its desolvating action on the coazervate which is formed. This desolvating action is further promoted with coagulation of the coazervate product of interaction by the further addition of alcohol, e. g. ethyl alcohol. Preferably the amount of alcohol which is additionally included in the mixture is such that the alcohol constitutes about 65-70% by volume of the mixture. Under such conditions the coazervate product of interaction is caused to occur in the form of a coagulum and can be readily separated from the alcoholic aqueous medium in which it is formed. This separation can be effected by drainage and the separated coagulum can be further dewatered by further addition of concentrated alcohol. The coagulum which has been separated and dewatered, as by use of a centrifuge or other means for accomplishing drainage, may be dried under a vacuum and the dried product can then be ground to a powder. The resulting powder can then be packaged in any suitable way for shipment to commercial users of the product.

The resulting product is in the form of a creamy white powder which has excellent properties as a stabilizer, especially for milk products. The powder is readily soluble in milk particularly when the milk is moderately warm and is maintained under slight agitation and, therefore, can be incorporated with a maximum of ease. Moreover, the product is completely compatible with milk. When the product is used as a stabilizer for ice cream excellent stabilization can be afforded by using about 6 to 9 ounces for each hundred gallons of the ice cream mix, thus showing the high potency of the product as a stabilizer. When so used the product is not sensitive to the temperature variations which occur during the manufacture of ice cream and its action is not materialy affected by differences in ice cream formulations. In all cases it results in uniform and dependable action as a stabilizer and does not result either in breakdown of the emulsion with formation of syneresis liquid or in excessive increase in viscosity of the mix so as to render the mix difficult to handle during the operations employed in the manufacture of ice cream. Moreover, the new product can be used as a stabilizer directly without blending it with any other substances.

The new product has uniform constituency throughout and all portions thereof exhibit identical properties. The complex is a stable product of interaction which does not exhibit any tendency during packaging, shipment or use to become separated into the components from which it was derived. That the new coazervate product is a new and different product as compared with the materials entering into its preparation is evidenced by the fact that the viscosity of a water solution thereof is widely different and lower as compared with averaging the viscosity-inducing characteristics of the respective components entering into the coazervate. Thus, the new product prepared by the coazervation of 12 parts of sodium carragheenate and 8 parts of sodium arabate is such that when it is made up so as to provide a water solution of 1% concentration the viscosity of the solution taken at 25° C. is substantially 51 centerpoises. By contrast, when 12 parts of sodium carragheenate and 8 parts of gum arabic are merely mixed so that the total of the mixture provides a 1% aqueous solution, the viscosity of such a solution at 25° C. is substantially 132 centerpoises.

While this invention has been described above in connection with a specific example representing typical preferred practice of this invention, it is to be understood that this has been done merely for purposes of illustration and that the practice of this invention may be varied according to the principles described more generally hereinbelow.

With respect to the modification of the naturally occurring carragheen and the modification of the naturally occurring gum arabic so as to substitute sodium cations therein, it is not essential that such substitution be carried to absolute completion. In any case, it is preferable that substantially all of the metal cations such as calcium, magnesium, iron, potassium, or the like, contained in the carragheen and in the gun arabic be replaced by sodium inasmuch as optimum conditions for the coazervation reaction are thus afforded and inasmuch as the optimum desired properties are obtained in the resulting coazervate. However, this invention may be very desirably practiced when the substitution of the sodium cations is carried to such extent that in the mixture of sodium carragheenate and sodium arabate the total weight of the cations in the carragheenate plus the arabate will consist of sodium to the extent of at least about 90% by weight. It is the percentage of sodium cations in the mixture of carragheenate and arabate which is of importance. Thus, if the carragheenate is prepared so that the cation content thereof consists essentially entirely of sodium it is not essential that the gum arabic be treated so as to form an arabate wherein at least 90% by weight of the cations contained therein consists of sodium so long as when the carragheenate and arabate solutions are mixed the total weight of cations contained in the carragheenate plus the arabate shall be at least about 90%. Similarly, if the arabate is prepared so that the cation content thereof consists of sodium either substantially entirely or in some amount well over 90%, then the cation content of the sodium carragheenate may be such that the sodium constitutes somewhat less than 90% of its cation content so long as in the mixture the cation content shall consist to the extent of at least about 90% by weight of sodium. In any event, however, it is necessary to modify the naturally occurring carragheen and gum arabic so as to accomplish the substitution of sodium cations therein to the extent above mentioned.

Carragheen is a substance which is adversely affected if the medium in which it is dissolved is excessively acidic. In the handling of the carragheen it is, therefore, desirable to keep the pH of any aqueous solution containing it so as not to occur substantially below 6. It is for this reason that the production of sodium carragheenate according to the method disclosed in my above-mentioned application Ser. No. 790,726 is preferred inasmuch as the sodium carragheenate syrup can be produced without injury to the carragheen resulting from excessive acidification.

When the sodium carragheenate syrup is mixed with the sodium arabate the pH of the aqueous medium in which the coazervation reaction occurs is preferably maintained so as to be of the order of 6.5 to 6.8 inasmuch as the reaction takes place most readily at such pH value and the resulting reaction product possesses the properties desired to the optimum extent. However, the pH of the medium may be reduced to about 6. The reaction will take place at a pH slightly below 6 but the yield is not as good and the resulting product is not as suitable, and for this reason the pH is maintained so as not to be below about 6. The pH of the solution in which the coazervation reaction takes place may be as high as 9 or even as high as 10 with good results. However, for the production of the new product in a condition best suited for most commercial purposes, the pH of the aqueous solution in which the product is produced ordinarily is substantially neutral and there is no point in carrying out the coazervation reaction at a pH substantially greater than 7 inasmuch as in such case it would ordinarily be desirable to lower the pH of the coazervate reaction product as by a slight acidification so as to bring it to an approximately neutral condition. Moreover, the reaction does not take place quite as readily when the pH of the aqueous medium is substantially above 7.

Gum arabic is unlike carragheen in that it is not adversely affected by relatively extreme acidification. Therefore, the gum arabic lends itself to removal of metal cations by acidification so that the cations form soluble salts which can be readily separated from the arabic acid. Ordinarily, the gum arabic is acidified so that the pH of the gum arabic solution is of the order of 1.5 and preferably, to get good separation of arabic acid, the pH of the gum arabic solution should be reduced to about 2 or below.

According to the above-described example the solution of recovered arabic acid was neutralized by adding sodium hydroxide thereto until the solution had a pH value of the order of 7 to 7.5. This, however, is merely for convenience so that when the gum arabic solution is mixed with the carragheen solution the pH of the mixture will be in the range above described. It is the pH range of the mixed solutions which is important rather than the pH of the individual solution prior to the mixture thereof, that is except for the qualification hereinabove mentioned that the solution of modified carragheen should not be below about 6. Thus, the carragheen solution may have a pH which is even higher than 10, inasmuch as carragheen is not adversely affected by such alkalinity. In such case the sodium arabate solution could have a pH somewhat below 6 so long as when the solutions are mixed together the pH value of the mixture would be within the range hereinabove indicated.

There is nothing which is critical insofar as the concentrations of the sodium carragheenate and sodium arabate solutions are concerned. However, as mentioned above, sodium carragheenate imparts a very high degree of viscosity to an aqueous solution in which it is dissolved, and for this reason it is generally impractical to work with a sodium carragheenate solution having a concentration substantially greater than 2%. It is normally desirable to work with as high concentrations as possible so as to minimize the amount of water and alcohol used in subsequent steps in the process. Since the sodium arabate is in no way comparable to the sodium carragheenate in its property of increasing the viscosity of aqueous solutions, it is best to use the sodium arabate in solutions of relatively high concentration, although from the point of view of functional operability the concentration of the solution is not critical. It is usually convenient, however, to use the sodium arabate in a solution whose concentration is approximately 35%.

In effecting the coazervation reaction some coazervation and coazervate formation will occur even in the absence of a desolvating agent such as alcohol. However, much better yields are obtainable and the properties of the resulting product are superior when the formation of the coazervate is assisted by the desolvating action of the alcohol. During the coazervation reaction it is desirable that the alcohol constitute at least about 20% by volume of the mixture of the alcohol and the solution of sodium carragheenate and sodium arabate while holding the alcohol concentration below about 35% so that premature coagulation will not occur. In other words, it is good practice in carrying out the coazervation to assist the formation and stabilization of the coazervate by the presence of about 20% to about 35% by weight of alcohol. Subsequently, the percentage of alcohol can be increased so as to produce the coazervate in a coagulated condition that is more readily susceptible to separation from the alcoholic aqueous medium.

In order to promote the desolvating of the coazervate any water-soluble alcohol may be employed inasmuch as the desolvating action is physical in its character. Ordinarily, any of the less expensive mono-hydric aliphatic alcohols may be employed such as methyl, ethyl, isopropyl, butanol, hexanol, and the like. Such water soluble alcohols act as water soluble organic solvents which have the effect of desolvating the coazervate and which may be used to coagulate the coazervate so that it may be readily separated from the aqueous medium in which it is formed and thereby recovered for ultimate drying so that it may be packaged and shipped in a dry powdered condition.

Insofar as the alcohol content of the individual sodium carragheenate and sodium arabate solutions is concerned considerable latitude may be employed inasmuch as the addition of alcohol to each of these solutions as indicated in the foregoing example is merely for the purpose of affording a desirable amount of alcohol in the resulting mixture of the two solutions. In the individual solutions the alcohol content may be varied very widely but preferably should be such that in the aqueous medium in which the coazervate is formed the alcohol content will be within the preferred range hereinabove indicated. If desired the amount of alcohol in either or both of the solutions of sodium carragheenate and sodium arabate may be substantially less than that indicated hereinabove as preferable or even may be omitted therefrom, the alcohol in such case being added after the solutions are blended so as to promote the formation and, subsequently, the coagulation of the coazervate; but in such case the yield of the coazervate is less and the amount of alcohol for obtaining a good coagulum is greater.

When the sodium carragheenate and the sodium arabate solutions are commingled there will be formation of a coazervate the nature of which will depend on the relative proportions of sodium carragheenate and sodium arabate, and in any case there is a modification of each of these substances. However, for affording desirable properties as a stabilizer while avoiding the difficulties which are incident to the use of carragheen, it is desirable that the ratio by weight of carragheenate to arabate be from about 12 to 6 to about 12 to 10. Within these limitations the disadvantages properties of the carragheen are overcome while still affording very high stabilization properties. As hereinabove indicated, it has been found advantageous for most purposes, and particularly in connection with the manufacture of ice cream, to produce the coazervate product of interaction so that the ratio of the carragheenate to the arabate entering into the formation of the coazervate will be approximately 12 to 8.

In the description of the preferred practice of this invention a small amount of potassium chloride is included which acts as a catalyst to promote the coazervation. Potassium chloride is particularly effective in this regard even when used in small amounts such as 1% concentration. The potassium chloride remains soluble and is not carried into the product which is produced. Other salts are not effective in this regard unless used in excessively large quantities and if salts other than of sodium or potassium are employed this results in the introduction of cations which tend to react with the coazervate product so as to introduce undesired cations therein.

I claim:

1. The coazervate product of interaction in an aqueous medium at a pH between about 6 and about 10 between a carragheenate and an arabate, at least about 90% by weight of the total cation content of said carragheenate plus said arabate consisting of sodium.

2. As a stabilizer for a milk product, the coazervate product of interaction defined in claim 1.

3. An ice cream mix containing as a stabilizer the coazervate product of interaction defined in claim 1.

4. The coazervate product of interaction of claim 1 wherein said cation content consists substantially entirely of sodium.

5. The coazervate product of interaction of claim 1 wherein the ratio by weight of the carragheenate to the arabate is of the order of 12:6 to 12:10.

6. The coazervate product of interaction in an aqueous medium at a pH between about 6 and about 10 between sodium carragheenate and sodium arabate in the weight ratio of said sodium carragheenate to said sodium arabate between about 12 to 6 and about 12 to 8, at least about 90% by weight of the cation content of said product being sodium.

7. A milk product containing as a stabilizer the coazervate product of interaction defined in claim 6.

8. The coazervate product of interaction of claim 6 wherein the ratio by weight of said sodium carragheenate to said sodium arabate is approximately 12 to 8 and wherein the cation content of said product consists substantially entirely of sodium.

9. A method which comprises the coazervation interaction of sodium carragheenate and sodium arabate in an aqueous medium at a pH between about 6 and about 9.

10. A method which comprises the preparation of an alcoholic aqueous solution of sodium carragheenate, the separate preparing of an alcoholic aqueous solution of sodium arabate, mixing the two solutions to provide a mixture comprising from about 20% to about 35% by volume of alcohol and having a pH between about 6 and about 10 and wherein at least about 90% by weight of the total cations contained in said sodium carragheenate plus said sodium arabate consists of sodium and wherein the ratio by weight of said sodium carragheenate to said sodium arabate ranges from about 12 to 6 to about 12 to 10 to form the coazervate product of interaction between said sodium carragheenate and said sodium arabate, coagulating said coazervate product of interaction by further addition of alcohol to the aqueous medium in which it is formed, and separating the coagulum from said medium.

11. A method according to claim 9 wherein said medium in which said coazervate product of interaction is formed contains potassium chloride as a catalyst.

12. A method which comprises the coazervation interaction in an aqueous medium at a pH between about 6 and about 10 between a carragheenate and an arabate dissolved in said medium in the presence of a water soluble alcohol, at least about 90% by weight of the total cation content of said carragheenate plus said arabate consisting of sodium.

13. A method according to claim 12 wherein the alcohol present during the coazervation interaction constitutes from about 20% to about 35% by volume of said aqueous medium, wherein the alcohol content of said medium is thereafter increased to coagulate said coazervate product of interaction and wherein the resulting coagulum is separated from said medium.

14. A method which comprises modifying naturally occurring carragheen by the substitution of sodium for the metal cations in naturally occurring carragheen, modifying naturally occurring gum arabic by the substitution of sodium for the metal cations contained in naturally occurring gum arabic, said substitution being such that at least about 90% by weight of the total cation content of the modified carragheen plus the modified gum arabic is sodium, commingling the modified carragheen with the modified gum arabic in solution in an aqueous medium at a pH between about 6 and about 10 and the coazervation interaction of said modified carragheen and said modified gum arabic in said aqueous medium.

15. A method according to claim 14 wherein a water soluble monohydric aliphatic alcohol is incorporated in said aqueous medium to promote the formation of said product of coazervation interaction by the action thereon of said alcohol, and to effect the coagulation of said product of said coazervation interaction, and wherein the resulting coagulum is separated from the alcoholic aqueous medium.

VICTOR CHARLES EMILE LE GLOAHEC.

No references cited.